United States Patent [19]

Blitz

[11] 4,338,891

[45] Jul. 13, 1982

[54] TEMPERATURE CONTROL SYSTEM FOR AUTOMOTIVE STORAGE COMPONENTS

[76] Inventor: James E. Blitz, 2832 Ross St., Highland, Ind. 46322

[21] Appl. No.: 198,438

[22] Filed: Oct. 20, 1980

Related U.S. Application Data

[62] Division of Ser. No. 115,996, Jan. 28, 1980, Pat. No. 4,286,551.

[51] Int. Cl.³ ............................ F01P 1/06; F01P 3/12
[52] U.S. Cl. .................. 123/41.31; 123/557; 165/51; 165/74; 165/163; 123/41.51
[58] Field of Search .................. 123/41.31, 41.51, 557, 123/142.5 E; 165/51, 74, 132, 163; 188/2 R, 152

[56] References Cited

U.S. PATENT DOCUMENTS

| | | | |
|---|---|---|---|
| 1,745,231 | 1/1930 | Prusacki | 123/142.5 E |
| 2,449,127 | 9/1948 | Kleist | 165/74 |
| 3,699,938 | 10/1972 | Frazier | 123/557 |
| 3,730,260 | 5/1973 | Raymond | 165/74 |
| 3,937,276 | 2/1976 | Ostward | 165/74 |
| 4,083,340 | 4/1978 | Furr et al. | 123/557 |
| 4,237,850 | 12/1980 | Connor et al. | 123/557 |

Primary Examiner—Craig R. Feinberg
Assistant Examiner—W. R. Wolfe
Attorney, Agent, or Firm—Philip Hill

[57] ABSTRACT

A system and method for controlling the temperature of the contents of storage vessels integral with an automotive transport power system, which includes a fluid-cooled internal combustion engine, is provided. A portion of the engine coolant fluid is circulated from the engine through one or more heat-exchange pipe coils, each located within a storage vessel carrying diesel fuel, compressed air, hydraulic oil, or the like, for use in automotive transport, to maintain a selected operating temperature in response to a temperature sensor. An auxiliary heating and pumping system is provided for use when the transport system is not in operation. The control system is particularly useful whenever the atmospheric temperature is high (above 90° F.) or low (below 35° F.).

6 Claims, 6 Drawing Figures

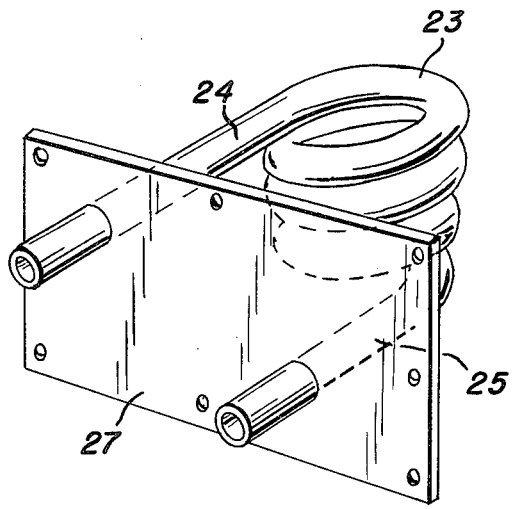
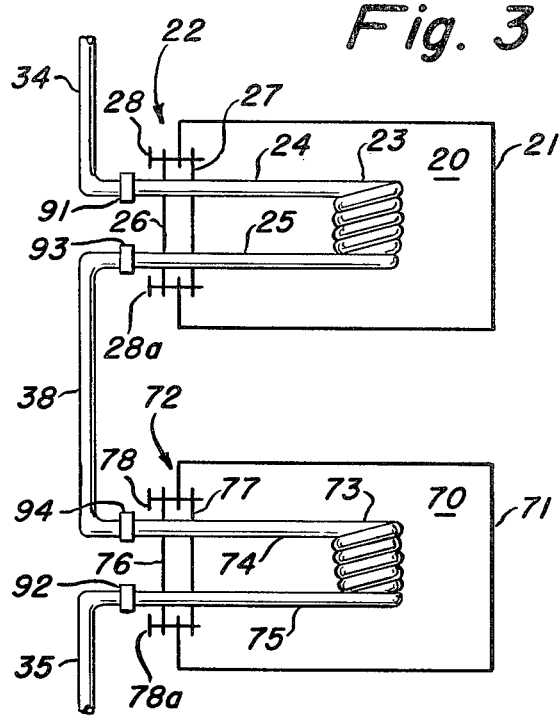
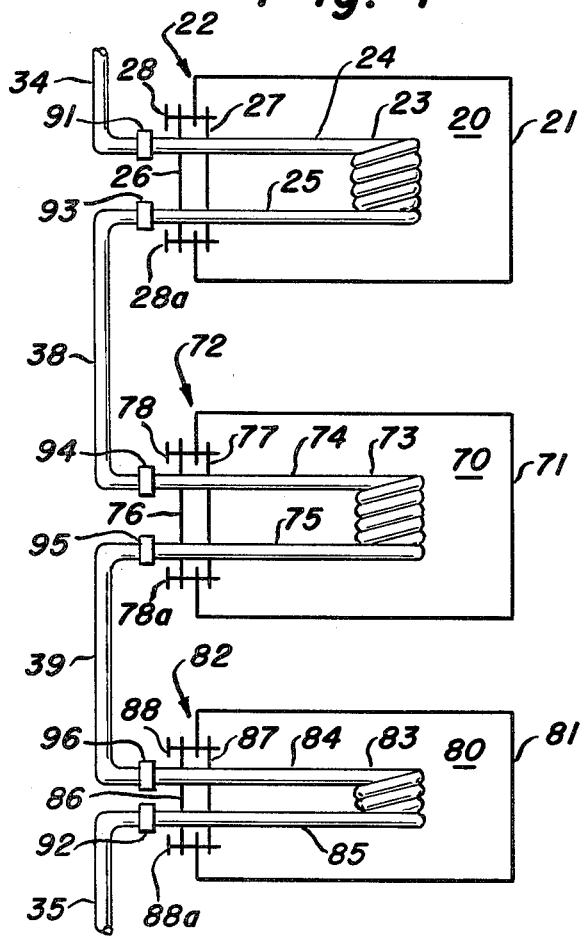
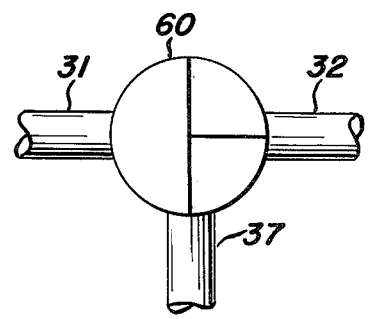
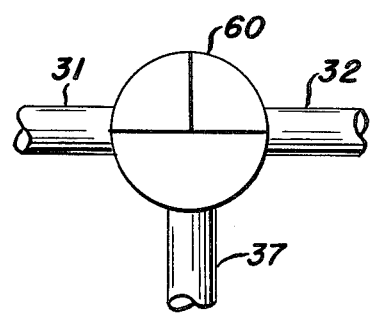

TEMPERATURE CONTROL SYSTEM FOR AUTOMOTIVE STORAGE COMPONENTS

This application is a division of application Ser. No. 115,996, filed Jan. 28, 1980, now U.S. Pat. No. 4,286,551.

BACKGROUND OF THE INVENTION

The present invention relates to a system and method for the control of the temperature maintained in the contents of storage vessels integral with an automotive, or truck, transport system by adapting portions of the existing internal combustion engine system to aid in effecting such control. Both high and low temperatures are avoided in diesel fuel, compressed air, and hydraulic oil storage vessels and lines. The system of the invention can be adapted for use either during transit or when the transport unit is at rest.

Low atmospheric temperatures have long been recognized as creating major problems for automotive transport. Diesel-powered trucks experience much difficulty in starting, fuel storage units develop plugged lines or sluggish flow of diesel oil due to greatly increased viscosity. Compressed air tanks, for use with the braking system of large trucks, experience plugged lines and inoperable valves due to formation of ice within the tank, the source of the moisture being the intake air to the compressor. Lubricating and hydraulic oil lines operate poorly because of the greatly increased viscosity of the oil employed. Other diesel-powered systems, including, for example, bulldozers and cranes, likewise encounter similar problems.

High atmospheric temperatures likewise create operational problems although these problems are generally less severe. Accordingly, little attention has been given to such problems although it is recognized that increased fuel vapor pressure may, under some circumstances, create a safety hazard.

Most attention has been given to various and elaborate schemes for improving cold-weather starting properties of diesel engines and to interior heating of cabs of trucks and general interior heating for other automotive vehicles. Most of such prior art employs, at least in part, the existing heat exchange system for cooling the automotive power unit.

Improved starting of diesel engines often involves the preheating of combustion air, as in U.S. Pat. No. 3,397,684, or external warming of engine coolant, as in U.S. Pat. No. 2,858,823. Separate combustion chambers may be employed as in U.S. Pat. No. 4,105,158 and in U.S. Pat. No. 3,795,234.

Heat exchange systems, including radiator coolant fluids, have also been employed in automotive systems for providing hot water to a recreational vehicle, as in U.S. Pat. No. 3,521,704; heating crude oil samples, as in U.S. Pat. No. 2,682,264; and warming foods, as in U.S. Pat. No. 3,874,361.

All of these approaches are intended to provide a warming function under a limited set of conditions, usually with the vehicle at rest. Little, if any, attention is paid to temperature control. Other than the cooling function of the radiator system in concert with the internal combustion engine, no attention is given to situations requiring cooling to approximately ambient temperature.

There remains a need for an effective system for controlling the storage temperatures of the various fluids employed in the operation of automotive transport and power units. This includes the effectuation of cooling, as required, as well as heating, all in response to the attendant weather conditions. This need becomes more emphatic when considered in the light of environmental and energy limitations such as those society faces presently.

SUMMARY OF THE INVENTION

This invention provides a system and method for effecting control of the temperature of the contents of storage vessels integral with an automotive transport power system which includes a fluid-cooled internal combustion engine. The system of the invention comprises at least:

(a) a storage tank, having two end sections;

(b) a generally coiled length of pipe, having two end sections, disposed within said tank, each pipe end section sealably inserted through a common tank end section, and fitted, externally to said tank end section, to receive conduit couplings;

(c) two conduit means, each having two ends, each coupled at a first end to a respective pipe end section, the first conduit means coupled at a second end to an inlet fluid coolant line and the second conduit means coupled at a second end to an outlet fluid coolant line, said fluid coolant lines being in communication with the internal combustion engine;

(d) temperature sensing means attached to said storage tanks; and (e) valve means, inserted in one of the conduit means, operable responsively to the temperature sensing means; together with additional means for heating and pumping whenever auxiliary power is required, as when the transport system is at rest.

This invention provides a method for enhancing the effective use of fluid coolant medium by circulation in a heat exchange mode through one or more vessels employed in the storage of diesel fuel, compressed air, hydraulic oil, or the like, aboard a transport vehicle, or truck, for use in the transport operation, or in conjunction with bulldozer or crane operations, or other on-site operations. Temperature control is effected by the pumping of heat exchange fluid in response to a demand signalled by a temperature sensor which communicates the temperature obtaining in the contents of the particular storage vessel.

It is an object of this invention to provide the requisite control, whether by heating or cooling, of the temperature of materials required for the effective operation of an automotive transport unit.

It is a further object of this invention to provide for such automotive operation as will afford an improved quality to the environment and an optimized conservation of energy supplies.

Further objects will be apparent from the succeeding description of the invention.

DESCRIPTION OF THE DRAWINGS

FIGS. 1-5 are exemplary, without limitation, of this invention.

FIG. 1 presents a diagrammatic representation of the system basically employed to control storage temperatures in conjunction with an automotive transport system.

FIG. 2 presents a diagrammatic representation of the configuration of the pipe coil section of FIG. 1 as sealed into a closure plate for insertion into each of the respective storage vessels.

FIGS. 3 and 4 present, respectively, representations of the expansion of the basic system to accommodate two or three storage vessels, each having its contents maintained at a controlled temperature.

FIGS. 5a and 5b represent cut-off valve settings employed with selected embodiments of this invention.

DETAILED DESCRIPTION OF THE INVENTION

Figure 1:
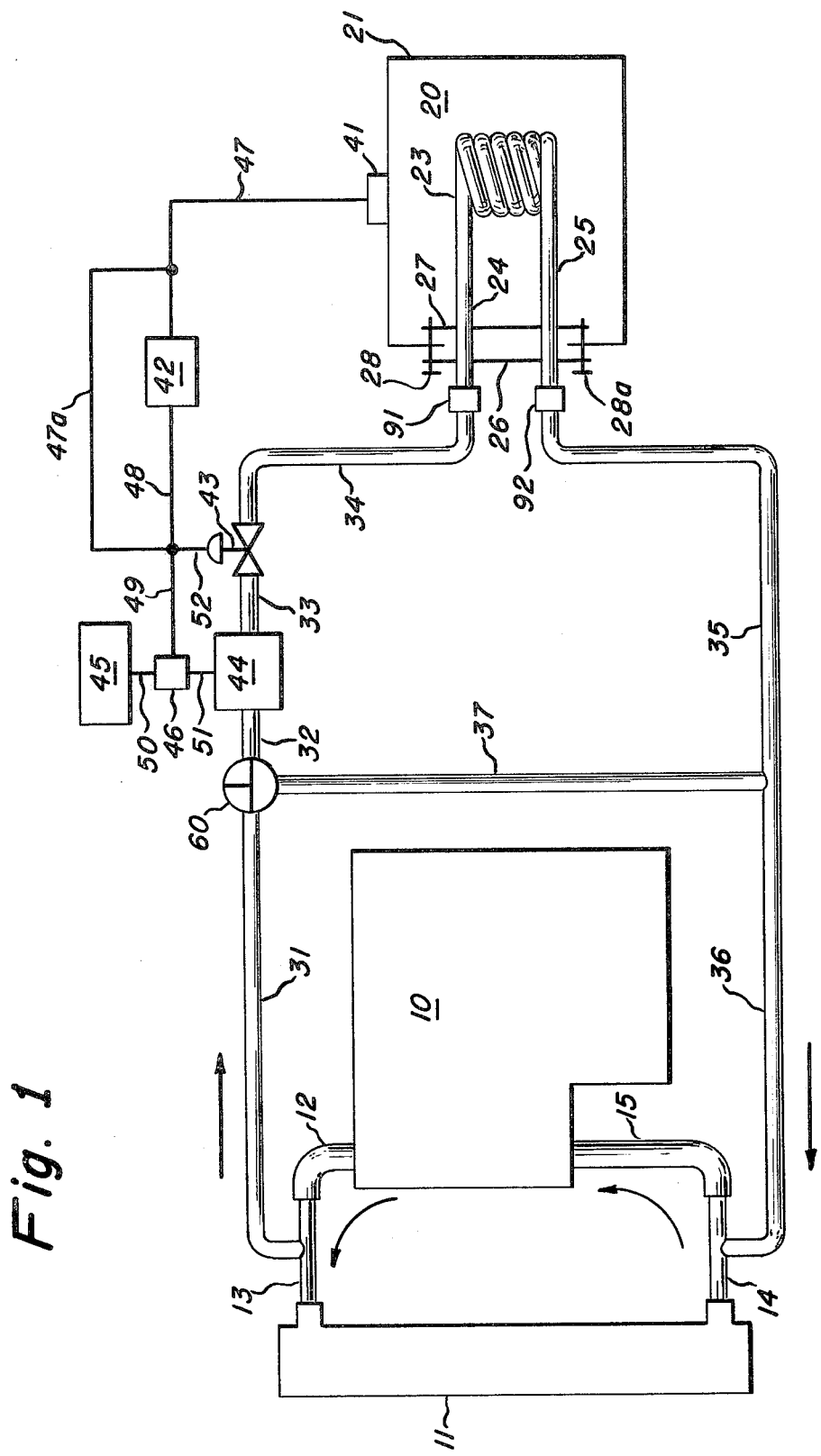

The control system of this invention is basically constituted as diagrammatically illustrated in FIG. 1. Internal combustion engine 10, preferably a diesel engine employed with a transport truck, is conventionally fitted with a radiator cooling system 11, a pumping system not shown, and piping sections 12, 13, 14 and 15 for circulation of coolant fluid to the engine 10 for withdrawal of heat generated by combustion of hydrocarbon fuel. A thermostat, not shown, is likewise conventionally located in the system to normally control the coolant fluid temperature. The inventive system includes an inlet fluid coolant line 31 and an outlet fluid coolant line 36. These lines, or conduits, provide a direct linkage through respective lines 13 and 14, to the conventional automotive power transport system which is thus integral with the inventive system.

Downstream from inlet fluid coolant line 31 are located, in order, three-way cut-off valve 60, conduit 32, heating and pumping means 44, which is generally not required to be operative at the same time as engine 10, conduit 33, motor-operated valve means 43, which may be a motor-operated valve, conduit 34, which thus serves essentially as an extension of inlet fluid coolant line 31, coupling 91, pipe end section 24, coiled pipe section 23, pipe end section 25, coupling 92, and conduit 35, which completes the circuit of flow by connection with outlet fluid coolant line 36. The pipe sections are continuous and substantially contained within substantially cylindrical storage vessel 20. Vessel end section 21 is closed while vessel end section 22 is partially cut out to describe a substantially rectangular opening to permit entry of the pipe sections. The pipe end sections are inserted sealably, as by welding or brazing, into holes drilled therefor in rectangular backing plate 27. Back plate 27 and the pipe coil and end sections are then inserted through the rectangular opening and positioned in line with rectangular sealing plate 26 together with inner and outer gaskets, not shown, each maintained in position by a plurality of bolts, illustrated by bolts 28 and 28a, passing therethrough. A suitable seal is effected by compression of the gaskets under the tightening action of the various bolts around the perimeter of the opening in the end section of the vessel.

Reference to FIG. 2 illustrates the positioning of the pipe coil section 23 and pipe end sections 24 and 25 relative to rectangular backing plate 27, which has been drilled to receive the respective pipe end sections which extend therethrough and are sealed to the backing plate. Plate 27 is further drilled to provide holes to receive bolts as described above.

Temperature sensing means 41, which may be a thermostat, is connected by line 47 to power source 42, which may be a battery, and then by lines 48 and 52 to valve 43 which is opened or closed responsive to signals from temperature sensor 41. An additional connection through line 49, switch 46, and line 51 leads to heating and pumping means 44 for activation thereof when required. Whenever external power is required, external electrical power source 45 is plugged into the system through line 50 and switch 46.

Whenever the engine 10 is operating the direction of flow through valve 60 will be as shown in FIG. 1, so that there will be no flow through by-pass conduit 37. At such times power source 45 will be disconnected, heating and pumping means 44 will not be operative and battery 42 will be charged through a generator, not shown, connected with the engine. Fluid will then be pumped thru line 31, the conduits and pipes of the system of the invention and finally back to the engine assembly through line 36. The thermostat sensor 41 can be set to control the vessel temperature as desired within the broad range from about 35° F. up to about 200° F. Preferably the temperature should be maintained within the range from 40° F. to about 150° F. Such temperature control will avoid wax formation and settling in diesel fuels, ice formation in compressed air, and excessive viscosity in hydraulic oils. Particularly with diesel fuels, a highly preferred controlled temperature lies within the range from about 80° F. up to about 120° F. for optimum power development in the interest of energy savings.

Whenever the engine 10 is not operating, as, for example, when the vehicle is parked, auxiliary power source 45, which may be any suitable power line, is engaged through line 50, as by plugging in, thus engaging heating and pumping means 44 through switch 46 and line 51. Sensor 41 remains operative through the lines shown in FIG. 1, or, optionally, may by-pass power source 42 through line 47a by switching means, not shown. Valve 43 may optionally remain in the circuit or be manually cut out by suitable switch means not shown. Should it be desired to control the temperature in the engine block 10 as well as in storage tank 20, the flow through valve 60 may be set as in FIG. 5b (or FIG. 1). Whenever it is desired to control only the temperature in the storage vessel 20, then the flow through valve 60 may be manually altered as in FIG. 5a, so that the flow cycle includes by-pass conduit 37 but not lines 31 and 36.

Whenever the system of the invention is intended to accommodate two or three storage vessels, the flow pattern will be modified as shown in FIGS. 3 and 4, respectively.

With reference to FIG. 3, the second vessel 70 is outfitted as with the first vessel 20, described above. Vessel 70 includes solid end section 71 and end section 72, having a substantially rectangular opening to accommodate pipe coil 73 together with pipe end sections 74 and 75, these latter end sections being sealably affixed to rectangular back plate 77. The latter back plate is firmly sealed to end section 72 through inner and outer gaskets, not shown, and rectangular sealing plate 76, all held in place and sealed by compression with a plurality of bolts including bolts 78 and 78a. Piping for vessels 20 and 70 is connected through connective conduit means 38 and conduit couplings 93 and 94. Attachment to the remainder of the system is achieved through conduit lines 34 and 35, and respective conduit couplings 91 and 92, which lines terminate as shown in FIG. 1.

With reference to FIG. 4, the third vessel 80 is outfitted as with vessels 20 and 70, above. Vessel 80 includes solid end section 81 and end section 82 which has a substantially rectangular opening to accommodate pipe coil 83 and pipe end sections 84 and 85, the latter end sections being sealably affixed to back plate 87. This back plate is sealably affixed to end section 82 through inner and outer gaskets, not shown, and rectangular sealing plate 86, all held in place and sealed by compression with a plurality of bolts, including bolts 88 and 88a. Piping for vessels 70 and 80 is joined through connective conduit means 39 and conduit couplings 95 and 96. Attachment to the remainder of the system is achieved, as before, through conduit lines 34 and 35, and respective conduit couplings 91 and 92, which lines terminate as shown in FIG. 1.

The control system of this invention is particularly useful whenever ambient temperatures are either high or low. At ambient temperatures below about 35° F., operating problems arise due to increased viscosity of hydrocarbon fuels and lubricants. At still lower temperatures, moisture accumulating in compressed air tanks freezes, causing blockages in lines and generally interfering with safe operation of transport equipment. At extremely low temperatures, as, for example, below about 0° F., viscosity effects increase greatly and a potential problem arises due to wax separation and settling in fuel tanks and lines. Use of additives to prevent or limit such problems can lead to additional problems of deposits in combustion zones. Other problems arise at ambient temperatures above about 90° F., particularly related to lowered viscosity of lubricant oils. At still higher temperatures, increased volatility of fuel presents both operating and safety problems.

During transport periods both in summer and winter the system of this invention may be employed to minimize operating problems by providing a control on storage temperatures, selected to maintain such temperatures in a preferred range for optimum vehicle performance. Whenever the transport unit is not in service, as when parked overnight, such a preferred storage temperature can be maintained by plugging into a local power source and activating the auxiliary heating and pumping means.

Much attention has been given to improved conditions for starting diesel engines, particularly in cold weather. The system of this invention will also serve to minimize such problems by including the engine block in the circulation path of the temperature control system whenever the transport vehicle is not in operation.

Storage temperature in fuel tanks of automotive transport systems may vary from the lowest exposure temperature experienced under winter conditions to extremely high temperatures when exposed to solar rays under the most severe summer conditions. These latter temperatures far exceed ambient temperatures and can lead to inherently unsafe storage and operating conditions. Accordingly, the system of this invention provides for both heating and cooling, as required, of stored components and accomplishes this with the same operating system.

In time periods when such temperatures as above are not experienced, the system of this invention may be shut down, or preferably may continue to be employed to maintain a particularly preferred, or optimum, storage temperature.

No unusual materials of construction are required. Typical aluminum storage vessels may be employed. When desired or indicated, the piping may be constructed of copper or other suitable material, keeping in mind any pressure limitations imposed by the particular component being stored. In some instances, rubber tubing connections may be employed. Whenever desired, any of the conduits or vessels may be suitably insulated to aid in effecting an efficient temperature control.

What is claimed is:

1. A system for controlling the temperature of the contents of a multiplicity of storage vessels integral with an automotive transport unit, said automotive transport unit including a fluid-cooled internal combustion engine, during periods when said internal combustion engine is not in operation, comprising:
   (a) a multiplicity of storage tanks, each having two end sections;
   (b) a like number of generally coiled lengths of pipe, each length of pipe being disposed within a separate storage tank and having two end sections, each pipe end section sealably inserted through a common end section of the separate storage tank and fitted, externally to said tank end section, to receive conduit couplings;
   (c) connective conduit means, coupled to respective pipe end sections and adapted to provide for serial flow through the multiplicity of coiled lengths of pipe;
   (d) two terminal conduit means, each having two ends, each coupled at a first end to a respective terminal pipe end section, the first terminal conduit means having interposed along its length heating and pumping means and coupled at a second end to an inlet fluid coolant line, the second terminal conduit means coupled at a second end to an outlet fluid coolant line, said fluid coolant lines being normally in communication with the internal combustion engine;
   (e) temperature sensing means attached to at least one of said storage tanks;
   (f) valve means, inserted in the first terminal conduit means, operable responsively to the temperature sensing means;
   (g) an external electrical power source for operating said heating and pumping means and valve means;
   (h) a three-way cut-off valve positioned at the junction of said inlet fluid coolant line and said second end of said first terminal conduit means; and
   (i) by-pass conduit means connecting the cut-off valve to the outlet fluid coolant line; whereby the fluid coolant can be optionally diverted from passage through the internal combustion engine, heated and pumped in response to the power source and temperature sensing means through at least the respective pipe coils and conduit means, to control and maintain the temperature of the contents of the respective storage vessels.

2. The system of claim 1 comprising two tanks adapted for temperature control and storage of, respectively, diesel fuel for use in an automotive transport unit, and compressed air for use in an automotive transport braking unit.

3. The system of claim 2 additionally comprising a third tank adapted for temperature control and storage of oil for use in an automotive transport hydraulic unit.

4. The system of claim 1 adapted to maintain the contents of the storage vessels at a temperature within the range from about 35° F. to about 200° F.

5. The system of claim 4 adapted to maintain the contents of the storage vessels at a temperature within the range from about 40° F. to about 150° F.

6. The system of claim 5 adapted to maintain the contents of the storage vessels at a temperature within the range from about 80° F. to about 120° F.

* * * * *